(12) United States Patent
Suzuki et al.

(10) Patent No.: US 10,597,041 B2
(45) Date of Patent: Mar. 24, 2020

(54) CONTROL APPARATUS FOR ELECTRIC VEHICLE, CONTROL SYSTEM FOR ELECTRIC VEHICLE, AND METHOD FOR CONTROLLING ELECTRIC VEHICLE

(71) Applicant: Hitachi Automotive Systems, Ltd., Hitachinaka-shi, Ibaraki (JP)

(72) Inventors: Keisuke Suzuki, Kawasaki (JP); Satoshi Kaneko, Atsugi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/766,348

(22) PCT Filed: Sep. 16, 2016

(86) PCT No.: PCT/JP2016/077390
§ 371 (c)(1),
(2) Date: Apr. 5, 2018

(87) PCT Pub. No.: WO2017/061252
PCT Pub. Date: Apr. 13, 2017

(65) Prior Publication Data
US 2018/0290664 A1    Oct. 11, 2018

(30) Foreign Application Priority Data
Oct. 9, 2015    (JP) .................................. 2015-200697

(51) Int. Cl.
*B60W 50/06* (2006.01)
*B60L 15/20* (2006.01)
(Continued)

(52) U.S. Cl.
CPC ............. *B60W 50/06* (2013.01); *B60L 15/20* (2013.01); *B60W 10/08* (2013.01);
(Continued)

(58) Field of Classification Search
CPC .. B60L 15/20; B60L 2200/28; B60L 2240/12; B60L 2240/421; B60L 2240/423;
(Continued)

(56) References Cited

U.S. PATENT DOCUMENTS

| | | |
|---|---|---|
| 5,208,754 A | 5/1993 | Nakaura et al. |
| 2005/0200061 A1* | 9/2005 | Nemoto ................. B60L 50/16 267/140.14 |

(Continued)

FOREIGN PATENT DOCUMENTS

| | | |
|---|---|---|
| EP | 2 578 461 A1 | 4/2013 |
| EP | 2 815 914 A1 | 12/2014 |

(Continued)

OTHER PUBLICATIONS

Extended European Search Report issued in counterpart European Application No. 16853406.3 dated Sep. 5, 2018 (seven (7) pages).

(Continued)

*Primary Examiner* — Atul Trivedi
(74) *Attorney, Agent, or Firm* — Crowell & Moring LLP

(57) ABSTRACT

An object of the present invention is to provide a control apparatus for an electric vehicle that can prevent or reduce a shock when the vehicle starts running from a stopped state. According to one embodiment of the present invention, a first vibration damping control torque calculated by a first calculation method based on a signal of a wheel speed sensor, or a second vibration damping control torque calculated by a second calculation method based on a signal other than the signal of the wheel speed sensor is selectively output.

8 Claims, 12 Drawing Sheets

(51) Int. Cl.
*B60W 10/08* (2006.01)
*B60W 30/18* (2012.01)
*B60W 30/20* (2006.01)

(52) U.S. Cl.
CPC ...... *B60W 30/18027* (2013.01); *B60W 30/20* (2013.01); *B60L 2200/28* (2013.01); *B60L 2240/12* (2013.01); *B60L 2240/421* (2013.01); *B60L 2240/423* (2013.01); *B60L 2240/461* (2013.01); *B60L 2260/42* (2013.01); *B60L 2270/145* (2013.01); *B60W 2510/081* (2013.01); *B60W 2520/105* (2013.01); *B60W 2520/28* (2013.01); *B60W 2540/10* (2013.01); *Y02T 10/645* (2013.01); *Y02T 10/72* (2013.01); *Y02T 10/7275* (2013.01)

(58) Field of Classification Search
CPC ........... B60L 2240/461; B60L 2260/42; B60L 2270/145; B60W 2540/10; B60W 10/08; B60W 2520/28; B60W 2520/105; B60W 2510/081; B60W 50/06; B60W 30/18027; B60W 30/20; Y02T 10/645; Y02T 10/72; Y02T 10/7275; H02P 29/00
USPC .......................................................... 701/70
See application file for complete search history.

(56) References Cited

U.S. PATENT DOCUMENTS

| | | | | |
|---|---|---|---|---|
| 2008/0255748 A1* | 10/2008 | Kumazaki | ................ | B60K 6/40 701/102 |
| 2010/0094495 A1 | 4/2010 | Fujimoto et al. | | |
| 2010/0256847 A1 | 10/2010 | Kimbara et al. | | |
| 2011/0137514 A1* | 6/2011 | Itabashi | ................ | B60W 10/06 701/31.4 |
| 2011/0213533 A1* | 9/2011 | Ueoka | ................ | B60K 6/445 701/66 |
| 2012/0197473 A1* | 8/2012 | Kshatriya | .............. | B60K 6/485 701/22 |
| 2012/0207620 A1* | 8/2012 | Dalum | .................... | B60K 6/12 417/44.1 |
| 2012/0323456 A1* | 12/2012 | Kato | ..................... | B60W 10/08 701/55 |
| 2013/0080012 A1* | 3/2013 | Kobayashi | ............ | B60W 30/20 701/70 |
| 2013/0090826 A1* | 4/2013 | Ohta | ..................... | B60W 10/06 701/70 |
| 2013/0296102 A1* | 11/2013 | Banker | ................ | B60W 10/196 477/4 |
| 2013/0296124 A1* | 11/2013 | Pietron | ................. | B60W 20/40 477/5 |
| 2013/0296125 A1* | 11/2013 | Gibson | ................ | B60W 10/06 477/5 |
| 2013/0297161 A1* | 11/2013 | Gibson | ................ | B60W 20/00 701/54 |
| 2014/0373676 A1* | 12/2014 | Nefcy | ................... | B60W 20/00 74/7 C |
| 2015/0087458 A1* | 3/2015 | Harada | ................. | B60W 10/02 475/5 |
| 2015/0105953 A1 | 4/2015 | Kim | | |
| 2015/0135863 A1* | 5/2015 | Dalum | ................... | B60K 25/00 74/11 |
| 2015/0158483 A1* | 6/2015 | Dalum | .................... | B60L 50/16 701/22 |
| 2015/0175152 A1* | 6/2015 | Dalum | ..................... | B60K 6/12 477/3 |
| 2015/0203105 A1* | 7/2015 | Liang | ...................... | B60L 15/20 701/22 |
| 2015/0283991 A1* | 10/2015 | Dalum | ................. | B60W 20/10 701/22 |
| 2016/0152224 A1* | 6/2016 | Tabata | ................. | B60W 10/115 701/22 |
| 2018/0043792 A1* | 2/2018 | Sawada | ................... | B60L 15/20 |
| 2018/0154773 A1* | 6/2018 | Dalum | ..................... | B60K 6/00 |
| 2018/0202379 A1* | 7/2018 | Nagashima | ......... | F02D 41/3058 |
| 2018/0230919 A1* | 8/2018 | Nagashima | ......... | F02D 41/3058 |
| 2019/0232949 A1* | 8/2019 | Takasu | ................ | B60K 6/22 |
| 2019/0276003 A1* | 9/2019 | Tsukada | ................ | B60W 10/08 |

FOREIGN PATENT DOCUMENTS

| | | |
|---|---|---|
| GB | 2 416 863 A | 2/2006 |
| JP | 5-4575 A | 1/1993 |
| JP | 2002-152916 A | 5/2002 |
| JP | 2009-173092 A | 8/2009 |
| WO | WO 2008/111436 A1 | 9/2008 |

OTHER PUBLICATIONS

Japanese-language International Search Report (PCT/ISA/210) issued in PCT Application No. PCT/JP2016/077390 with English translation dated Nov. 22, 2016 (four (4) pages).

Japanese-language Written Opinion (PCT/ISA/237) issued in PCT Application No. PCT/JP2016/077390 dated Nov. 22, 2016 (four (4) pages).

* cited by examiner

CONTROL APPARATUS FOR ELECTRIC VEHICLE, CONTROL SYSTEM FOR ELECTRIC VEHICLE, AND METHOD FOR CONTROLLING ELECTRIC VEHICLE

TECHNICAL FIELD

The present invention relates to a control apparatus, a control system, and a control method for an electric vehicle.

BACKGROUND ART

A conventional control apparatus for an electric vehicle extracts a difference between a motor rotational speed and an average rotational speed of left and right drive wheels as a vibration component of a torsional vibration in a torque transmission system, and calculates a vibration damping control torque for canceling out this vibration component, thereby correcting a driver request drive torque. One example regarding the above-described technique is discussed in PTL 1.

CITATION LIST

Patent Literature

PTL 1: Japanese Patent Application Public Disclosure No. 2002-152916

SUMMARY OF INVENTION

Technical Problem

However, generally, a signal of a wheel speed sensor has low resolution in a low vehicle speed region, and therefore use of only the difference between the motor rotational speed having high resolution and the average rotational speed of the left and right drive wheels having low resolution may lead to a sudden change in the difference from the motor rotational speed signal when the vehicle starts running from a stopped state. A large vibration damping control torque is calculated according to this sudden change in the difference, which raises a possibility of causing a shock.

An object of the present invention is to provide a control apparatus for an electric vehicle that can prevent or reduce the shock when the vehicle starts running from the stopped state.

Solution to Problem

According to one embodiment of the present invention, a first vibration damping control torque calculated by a first calculation method based on a signal of a wheel speed sensor or a second vibration damping control torque calculated by a second calculation method based on a signal other than the signal of the wheel speed sensor is selectively output.

Therefore, the shock when the vehicle starts running from the stopped state can be prevented or reduced.

DESCRIPTION OF EMBODIMENTS

First Embodiment

Figure 1:
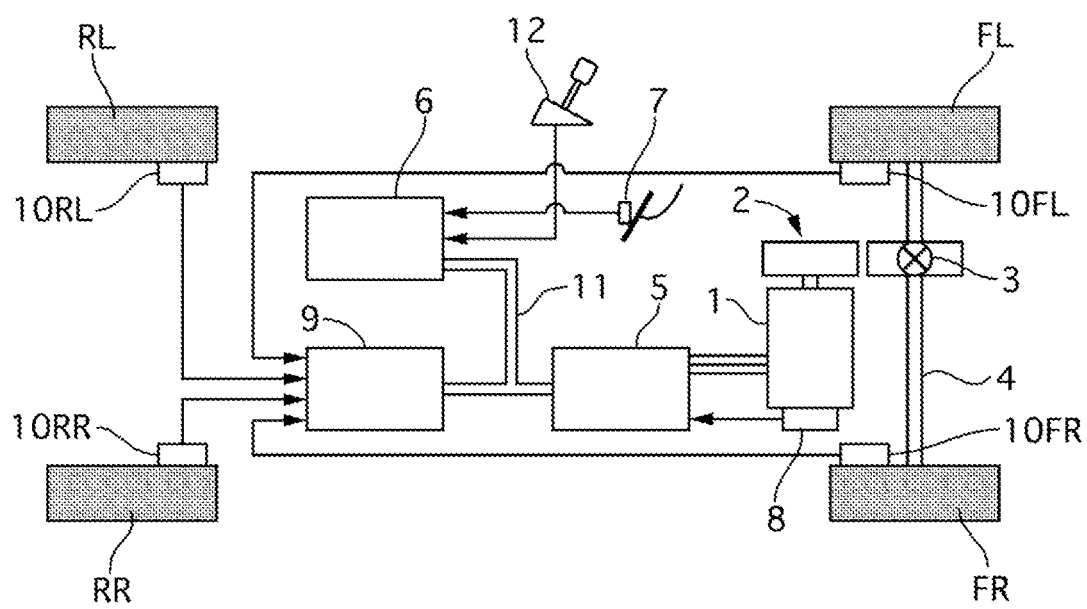
FIG. 1 is a system diagram of an electric vehicle according to a first embodiment.

FIG. 1 is a system diagram of an electric vehicle according to a first embodiment. The electric vehicle according to the first embodiment is a front-wheel-drive vehicle (a two-wheel-drive vehicle) in which front wheels FR and FL are driven by an electric motor 1. A differential gear 3 is connected to the electric motor 1 via a speed reduction mechanism 2. A drive shaft 4 is connected to the differential gear 3. The front wheels FL and FR are connected to the drive shaft 4. Electric power is supplied from a not-illustrated high-voltage battery to the electric motor 1 via an inverter 5. Driving of the inverter 5 is controlled by a vehicle controller 6.

The electric vehicle includes a shift lever 12, an accelerator position sensor 7, and a resolver 8. The shift lever 12 outputs a range position signal indicating a running mode of the vehicle. The accelerator position sensor 7 outputs an accelerator position signal. The resolver 8 outputs a motor rotational speed signal including a rotational direction of the electric motor 1. The vehicle controller 6 includes a first reception portion, which receives the range position signal from the shift lever 12 and the accelerator position signal from the accelerator position sensor 7. Further, the vehicle controller 6 includes a second reception portion, which receives the motor rotational speed signal from the resolver 8 via the inverter 5. The shift lever 12 is operated by a driver, and outputs the range position signal indicating a parking range (hereinafter referred to as a P range) when the vehicle is parked, a neutral range (hereinafter referred to as an N range) when no power is transmitted, a drive range (hereinafter referred to as a D range) when the vehicle moves forward, and a reverse range (hereinafter referred to as an R range) when the vehicle moves backward.

The inverter 5 receives wheel speeds of rear wheels RL and RR (a left trailer wheel speed and a right trailer wheel speed) via a brake controller 9. The brake controller 9 is connected to wheel speed sensors 10FL, 10FR, 10RL, and 10RR (hereinafter also referred to as simply 10) mounted on the individual wheels, and receives a rotational speed signal of each of the wheels. The wheel speed sensors 10 each detect a wheel speed from a cycle of an electromagnetic pulse. The brake controller 9 adjusts brake fluid to be supplied to a brake unit of each of the wheels to control a braking torque of each of the wheels based on a brake operation amount input by the driver. Information communication between the inverter 5, the vehicle controller 6, and the brake controller 9 is carried out via a CAN communication line (a communication apparatus) 11. The vehicle controller 6 calculates a drive torque instruction value directed to the electric motor 1 based on the accelerator position and the like, and drives the inverter 5 according to the drive torque instruction value.

Figure 2:
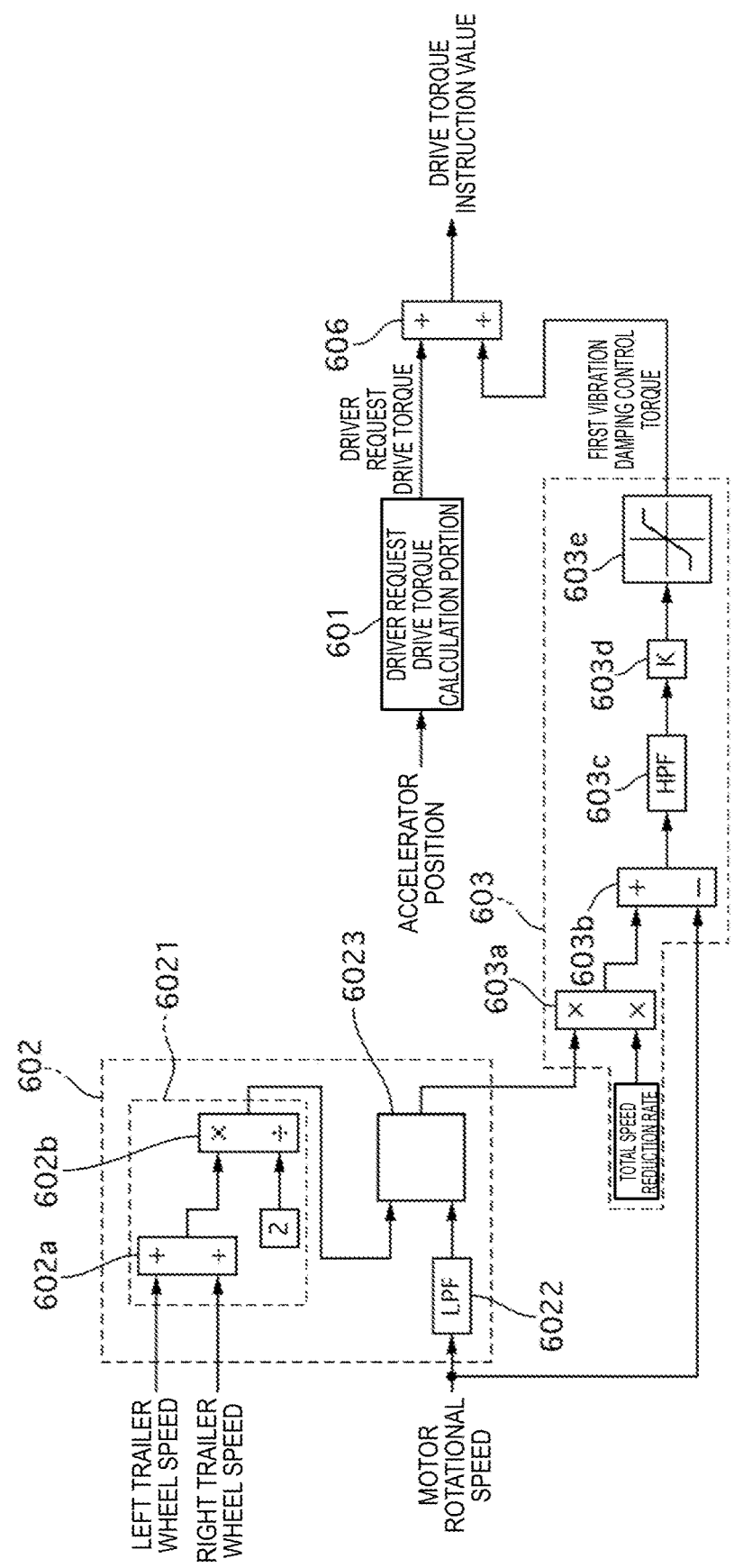
FIG. 2 is a control block diagram of a vehicle controller 6 according to the first embodiment.

FIG. 2 is a control block diagram of the vehicle controller 6 according to the first embodiment.

A driver request drive torque calculation portion 601 calculates a driver request drive torque based on the accelerator position. The driver request drive torque has a value increasing as the accelerator position increases.

A vehicle body speed estimation portion 602 includes a first estimation portion 6021, a second estimation portion 6022, and a vehicle body speed selection portion 6023. The first estimation portion 6021 estimates a vehicle body speed from the left and right trailer wheel speeds detected by the rear left wheel speed sensor 10RL and the rear right wheel speed sensor 10RR (hereinafter, the vehicle body speed estimated from the trailer wheel speeds will be also referred to as a VSP1). The second estimation portion 6022 estimates a vehicle body speed from the motor rotational speed detected by the resolver 8 (hereinafter, the vehicle body speed estimated from the motor rotational speed will be also referred to as a VSP2). The vehicle body speed selection portion 6023 selects and outputs one of the vehicle body speeds estimated by the first estimation portion 6021 and the second estimation portion 6022 (hereinafter, the estimated vehicle body speed selected by the vehicle body speed selection portion 6023 will be also referred to as a VSP).

The first estimation portion 6021 includes an addition portion 602a and a division portion 602b. The addition portion 602a adds the left and right trailer wheel speeds. The division portion 602b outputs, as the VSP1, a value acquired by dividing an output of the addition portion 602a by 2, i.e., an average value of the left and right trailer wheels.

The second estimation portion 6022 is a low-pass filter, and outputs, as the VSP2, a value acquired by extracting a frequency band in consideration of inertia of the vehicle from the motor rotational speed.

A first vibration damping control torque calculation portion 603 calculates a first vibration damping control torque based on the VSP estimated by the vehicle body speed estimation portion 602 and the motor rotational speed detected by the resolver 8. A multiplication portion 603a multiplies the VSP by a total speed reduction rate (a speed reduction rate of the speed reduction mechanism 2×a speed reduction rate of the differential gear 3). A subtraction portion 603b extracts a vibration component contained in the motor rotational speed by subtracting the motor rotational speed from an output of the multiplication portion 603a. A high-pass filter 603c subtracts a steady-state deviation (a deviation due to a difference between a calculated value and an actual value of a tire dynamic radius) component from an output of the subtraction portion 603b. A cutoff frequency of the high-pass filter 603c is set to a value that allows a wheel slip to be detected (for example, lower than 1 Hz). A gain multiplication portion 603d outputs, as the first vibration damping control torque, a value acquired by multiplying a vibration component that has passed through the high-pass filter 603c by a predetermined control gain K. A limiter processing portion 603e limits upper and lower limit values of the first vibration damping control torque within a certain range.

[Improvement of Effect of Eliminating or Reducing Torsional Vibration]

When a motor torque is raised in a stepwise manner at the time of sudden acceleration on the electric vehicle, a torsional vibration occurs in a torque transmission system due to a repetition of a torsion and a release of the drive shaft. The electric motor is highly responsive to the torque compared to an engine, and therefore leads to a reduction in ride comfort and an increase in a vibration/noise level upon transmission of the torsional vibration to the vehicle body via a mount, especially when this vibration is superimposed on a resonant frequency of the vehicle body. Therefore, the conventional electric motor extracts, as the vibration component of the torsional vibration, the difference between the motor rotational speed and the average rotational speed of the left and right drive wheels (a drive wheel speed), and calculates the vibration damping control torque for canceling out this vibration component, thereby correcting the driver request drive torque.

However, calculating the vibration damping control torque from the difference between the motor rotational speed and the drive wheel speed results in a failure to calculate an appropriate vibration damping control torque with respect to the torsional vibration especially while the vehicle is running on a low μ road, making it impossible to achieve a sufficient effect of eliminating or reducing the vibration. The reason therefor will be described below.

Generally, the rotational speed of each of the wheels is detected by the wheel speed sensor and is input to the brake controller, which means that the controller controlling the electric motor acquires the drive wheel speed signal from the brake controller via the CAN communication line. Therefore, a communication delay from the actual drive wheel speed (the value detected by the sensor) occurs in the drive wheel speed acquired by the controller. On the other hand, no communication delay occurs in the motor rotational speed because the motor rotational speed is directly input from the resolver to the controller. Then, when the wheel slips on the low μ road, a mass of the vehicle is separated from apparent inertia of the tire and therefore the apparent tire inertia reduces. Therefore, a frequency of the torsional vibration on the low μ road (approximately 10 to 20 Hz) is higher than a frequency of the torsional vibration on a high μ road (approximately 5 to 9 Hz). Therefore, calculating the vibration damping braking torque while the vehicle is running on the low μ road makes the vibration of the motor rotational speed and the vibration of the drive wheel speed out of phase with each other, leading to a calculation of an inappropriate (out-of-phase) vibration damping braking torque.

Figure 3:
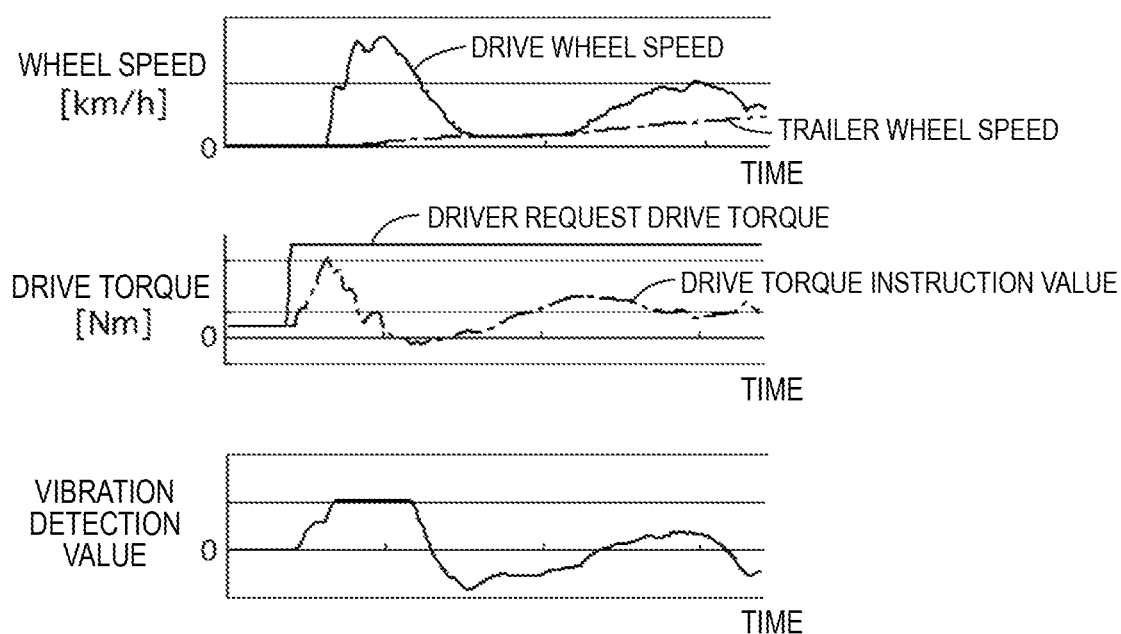
FIG. 3 is a timing chart of a wheel speed, a drive torque, and a vibration detection value when a vibration damping control torque is calculated with use of a high-pass filter.

Known methods for avoiding an influence of the above-described communication delay include a method that directly inputs the drive wheel speed from the wheel speed sensor without the intervention of the CAN communication line, and a method that calculates the vibration damping control torque from the motor rotational speed with use of a high-pass filter. However, the former method raises a problem of a cost increase such as an addition of a circuit. Further, the latter method leads to deterioration of a slip control performance because a vibration damping control torque out of phase is calculated at an initial stage of the slip due to the slip of the drive wheel. FIG. 3 is a timing chart of the wheel speed, the drive torque, and a vibration detection value when the vibration damping control torque is calculated with use of the high-pass filter. The method using the high-pass filter cannot distinguish the slip of the drive wheel (=an increase in the motor speed) and the sudden acceleration from each other, and therefore calculates the vibration damping control torque out of phase with the slip of the drive wheel at the initial stage of the slip. Therefore, the motor rotational speed and the drive wheel speed are not stabilized, so that the slip control performance is deteriorated.

Figure 4:
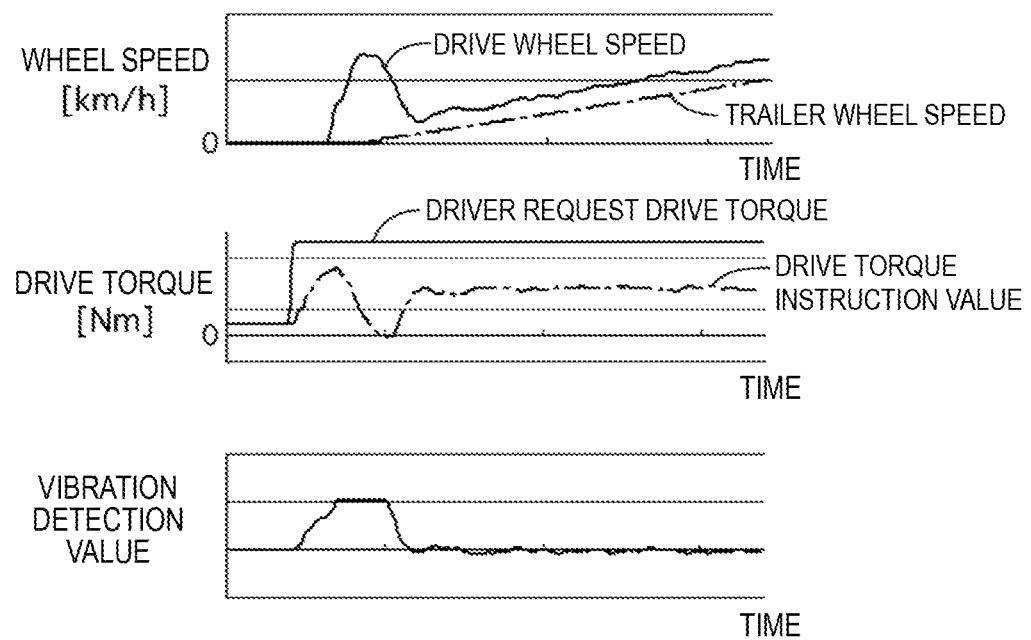
FIG. 4 is a timing chart illustrating an effect of eliminating or reducing a torsional vibration when the vibration damping control torque is calculated by a trailer wheel speed method according to the first embodiment.

On the other hand, in the first embodiment, the first vibration damping control torque calculation portion 603 calculates the first vibration damping control torque based on the difference between the motor rotational speed and the vehicle body speed estimated from the left and right trailer wheel speeds. The vehicle body speed does not vibrate regardless of the slip state of the wheel, and therefore is not out of phase with the motor rotational speed. Further, the first embodiment allows the acceleration component and the slip of the drive wheel to be distinguished from each other by subtracting the vehicle body speed from the motor rotational speed. Therefore, the first embodiment allows an appropriate first vibration damping control torque to be calculated with respect to the torsional vibration regardless of the slip state of the wheel, thereby succeeding in improving the effect of eliminating or reducing the torsional vibration. FIG. 4 is a timing chart illustrating the effect of eliminating or reducing the torsional vibration when the vibration damping control torque is calculated by the trailer wheel speed method according to the first embodiment. The first embodiment allows the vibration to be detected without being out of phase with the slip of the drive wheel, and therefore stabilizes the motor rotational speed and the drive wheel speed, thus exhibiting an excellent performance of converging the slip without impeding the slip control. Further, the first embodiment is unaffected by the influence of the communication delay, and therefore can be applied to a conventional system that introduces the left and right trailer wheel speeds from the brake controller 9 via the CAN communication line. Therefore, the first embodiment does not require the addition of the circuit or the like for directly inputting the trailer wheel speed from the wheel speed sensor 10, thereby succeeding in preventing or cutting down the complication of the system and the cost increase.

Figure 7:
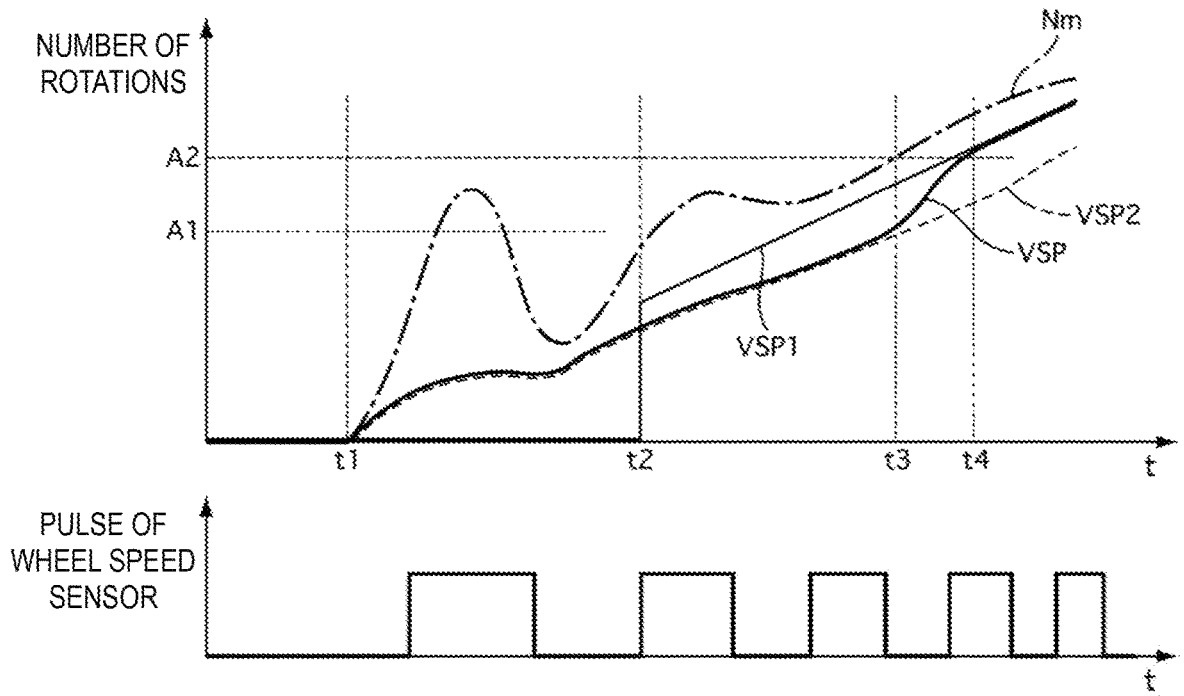
FIG. 7 is a timing chart when the electric vehicle according to the first embodiment starts running.

Now, a reason for selecting any one of the VSP1 and the VSP2 will be described. As described above, the signal output from the wheel speed sensor 10 is a pulse signal. FIG. 7 is a timing chart illustrating changes in the motor rotational speed (hereinafter referred to as an Nm), the VSP1, the VSP2, and the VSP. As indicated by a thin solid line in FIG. 7, when the vehicle starts running from a stopped state, the tire rolls by a distance corresponding to generation of a plurality of pulses and the speed is calculated based on a time interval between these pulses, so that an actual speed is already generated when the speed is determined. Therefore, the VSP1 suddenly rises, and the difference between the Nm and the average rotational speed of the left and right trailer wheels suddenly changes. As a result, since the first vibration damping control torque calculation portion 603 calculates the first vibration damping control torque according to this change in the difference, the vibration damping control torque changes, thereby raising a possibility of causing a shock. Therefore, the first embodiment is configured to perform the vibration damping control with use of the VSP2 estimated based on the Nm, which has high resolution even in an extremely low vehicle speed region.

Figure 5:
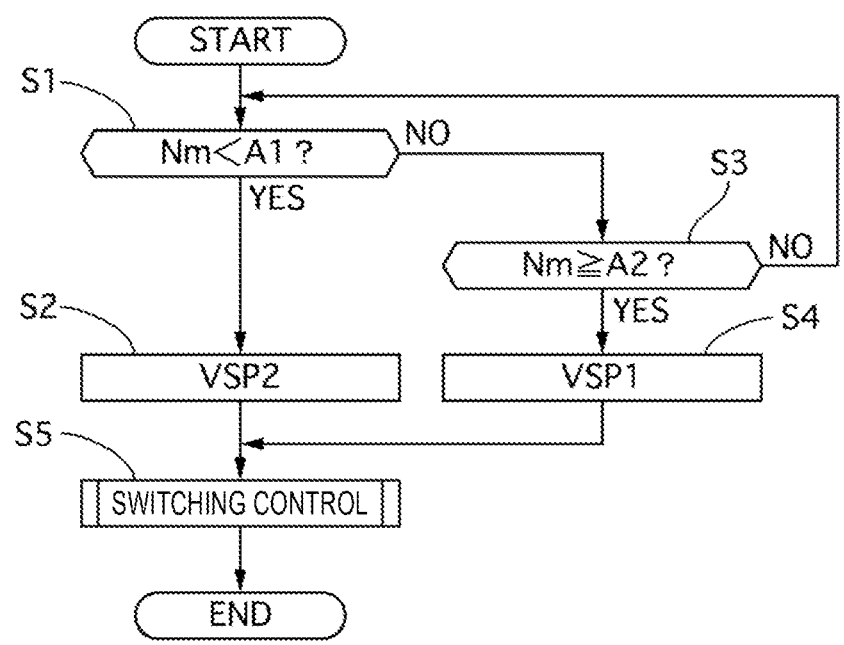
FIG. 5 is a flowchart illustrating control processing performed by a vehicle body speed selection portion according to the first embodiment.

FIG. 5 is a flowchart illustrating control processing performed by the vehicle body speed selection portion according to the first embodiment.

In step S1, the vehicle body speed selection portion 6023 determines whether the Nm is lower than a predetermined rotational speed A1 (hereinafter also referred to as an A1). If the Nm is lower than the A1, the processing proceeds to step S2, in which the vehicle body speed selection portion 6023 selects the VSP2. If the Nm is the A1 or higher, the processing proceeds to step S3. Now, the predetermined rotational speed A1 is a predetermined speed at which the wheel speed sensor 10 can determine the speed.

In step S3, the vehicle body speed selection portion 6023 determines whether the Nm is a predetermined rotational speed A2 (hereinafter also referred to as an A2) or higher. If the Nm is the A2 or higher, the processing proceeds to step S4, in which the vehicle body speed selection portion 6023 selects the VSP1. If the Nm is lower than the A2, the processing returns to step S1. Now, the predetermined rotational speed A2 is a value higher than the A1, and a predetermined speed at which control hunting can be avoided. As a result, the first embodiment can provide hysteresis to the switching between the VSP1 and the VSP2, and secures a stable vibration damping performance by preventing or reducing the control hunting.

In step S5, switching control of smoothly switching the VSP is performed when switching the VSP. In the following description, the switching control will be described in detail.

(Regarding Switching Control Processing)

Figure 6:
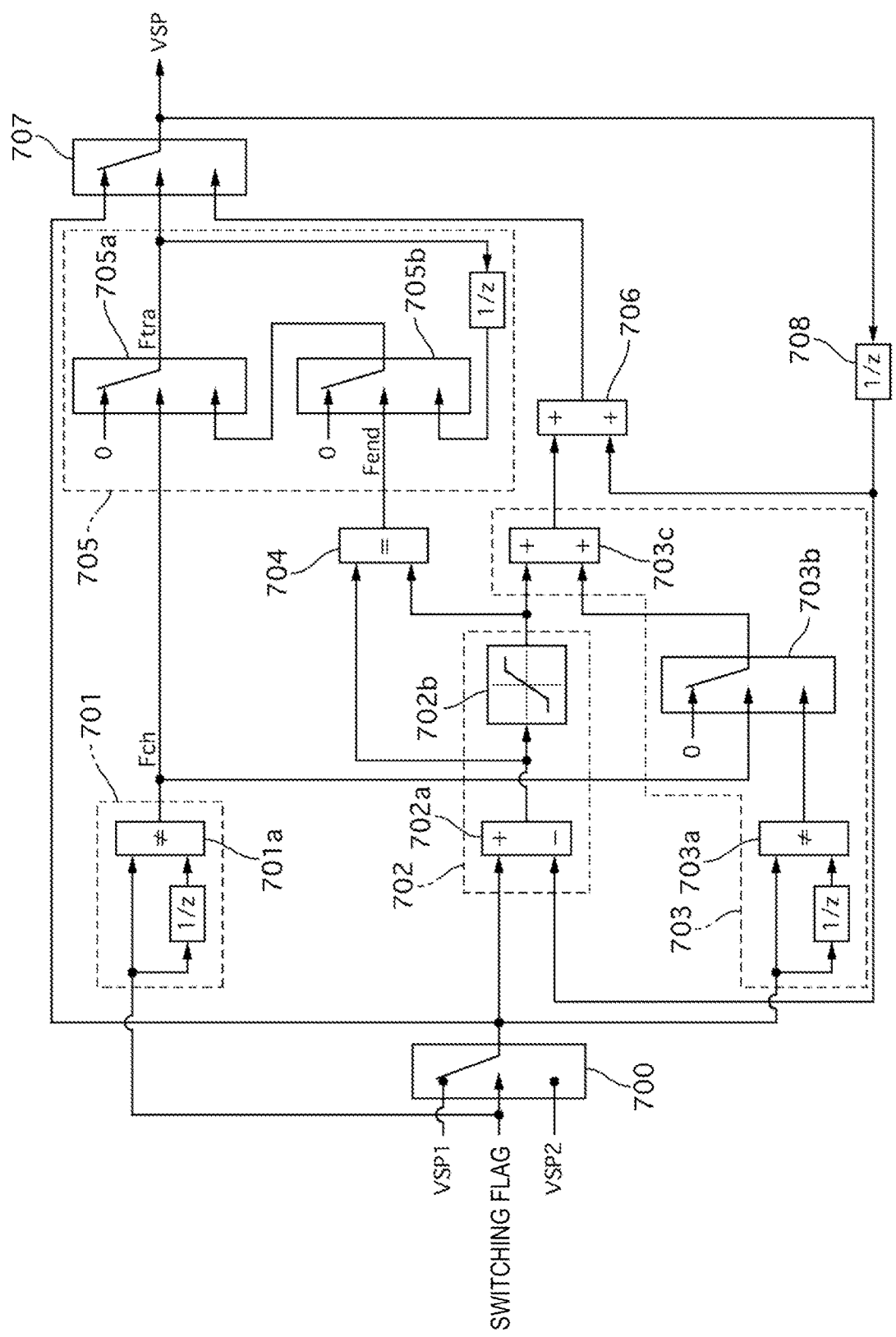
FIG. 6 is a control block diagram illustrating switching control processing according to the first embodiment.

FIG. 6 is a control block diagram illustrating the switching control processing according to the first embodiment. In FIG. 6, (1/Z) indicates a previous value. As a switching flag Fmm, Fmm=F12 is output when the VSP is switched from the VSP1 to the VSP2, and Fmm=F21 is output when the VSP is switched from the VSP2 to the VSP2.

A VSP switching portion 700 outputs a post-switching VSP according to the value of the switching flag Fmm. In other words, the VSP2 is the post-switching VSP when the switching flag Fmm is Fmm=F12, and the VSP1 is the post-switching VSP when the switching flag Fmm is Fmm=F21.

A transition processing start determination portion 701 determines whether the value of the switching flag Fmm does not match the previous value by a determination portion 701a, and outputs Fch=ON when the value of the switching flag Fmm does not match the previous value (when the switching flag Fmm is switched from F12 to F21 or F21 to F12), and otherwise outputs Fch=OFF.

A transition speed determination portion 702 calculates a first difference, which is a difference between the post-switching VSP and a previous value of the VSP (hereinafter referred to as a previous VSP) currently output by a previous value output portion 708, by a first difference calculation portion 702a. Next, a limitation portion 702b outputs the first difference without limiting it if the first difference does not exceed a maximum limit value or a minimum limit value of a preset change amount, and outputs the limit value if the first difference exceeds the limit value. By this operation, the transition speed determination portion 702 sets a transition speed (an allowable change amount per unit time during the transition) when the vehicle body speed transitions from one vehicle body speed to the other vehicle body speed, at the time of the switching of the estimated vehicle body speed.

An ongoing transition vibration damping performance compensation portion 703 calculates a second difference, which is a difference between the post-switching VSP and the previous value of the post-switching VSP, by a second difference calculation portion 703a. Next, the ongoing transition vibration damping performance compensation portion 703 outputs the second difference if Fch is ON and outputs 0 if Fch is OFF by a compensation determination portion 703b. Then, the ongoing transition vibration damping performance compensation portion 703 outputs a third difference, which is a sum of the value output from the transition speed determination portion 702 and the second difference, by an addition portion 703c. By this operation, the ongoing transition vibration damping performance compensation portion 703 compensates for a speed corresponding to the change in the post-switching VSP, thereby securing the vibration damping performance, even before the VSP is completely switched to the post-switching VSP.

A transition processing end determination portion 704 determines whether the first difference and the first difference after the limitation (any of the limit value and the first difference) match each other. Then, if they match each other, the transition processing end determination portion 704 determines that the VSP catches up with the post-switching VSP and then outputs Fend=ON since the first difference is smaller than the limit value. If they do not match each other, the transition processing end determination portion 704 determines that the VSP is in a limited state and does not yet catch up with the post-switching VSP and then outputs Fend=OFF.

A transition processing ongoing determination portion 705 outputs a transition processing ongoing flag Ftra=1 when Fch is OFF and outputs a result of a determination made by a second determination portion 705b, which will be described below, when Fch is ON, by a first determination portion 705a. The second determination portion 705b outputs 0 when Fend is ON and outputs a previous value of the value output from the first determination portion 705a when Fend is OFF. In other words, the first determination portion 705a first outputs Ftra=1 when a request to switch the VSP is output, and then switches the output to the result of the determination made by the second determination portion 705b upon an end of the switching request. At this time, while Fend is OFF, the result of the determination made by the second determination portion 705b is kept at 1, and therefore Ftra=1 is continuously output from the first determination portion 705a. After that, when the result of the determination made by the second determination portion 705b is changed to 0, 0 is also output to the first determination portion 705a, and therefore Ftr=0 is output from the first determination portion 705a.

An ongoing transition VSP calculation portion 706 adds the previous value of the VSP to the third difference. By this operation, the ongoing transition VSP calculation portion 706 can output the VSP during the transition according to a managed transition speed while compensating for the speed corresponding to the change in the post-switching VSP, even during the transition according to the switching of the VSP.

A final output determination portion 707 outputs any of the post-switching VSP and the VSP during the transition based on the result of the determination made by the transition processing ongoing determination portion 705.

FIG. 7 is a timing chart when the electric vehicle according to the first embodiment starts running. This is a state in which the vehicle is first in the stopped state and then the VSP2 is selected.

At time t1, when the driver starts moving the vehicle by pressing an accelerator pedal, the Nm changes suddenly according thereto with an amount corresponding to the torsion also added thereto. At this time, the VSP2 gently changes due to the low-pass filter. At this time, an appropriate value, 0 is output as the VSP1.

At time t2, although the vehicle speed reaches a vehicle speed at which the wheel speed sensor 10 can detect the pulse signal, the VSP2 is acquired as the VSP since the Nm is still lower than the A2.

At time t3, when the Nm reaches the A2 and the switching flag Fmm is switched from F21 to F12, the transition processing ongoing flag Ftra changes from 0 to 1. Then, a value gradually approaching from the VSP2 to the VSP1 is output as the VSP.

At time t4, when the VSP and the VSP1 match each other, the transition processing ongoing flag Ftra changes from 1 to 0, and the VSP1 is output as the VSP. As a result, the switching is fully completed.

In this manner, the first embodiment can realize the switching that does not cause the driver to feel uncomfortable while securing the vibration damping performance by gradually approaching to the VSP1 after the switching while taking into consideration the speed corresponding to the change in the VSP1 after the switching, even if there is a deviation between the VSP2 and the VSP1 when the estimated vehicle body speed is switched.

In the above-described manner, the first embodiment brings about the following advantageous effects.

(1) The control apparatus for the electric vehicle configured to drive the wheel by the electric motor 1 includes the vehicle body speed selection portion 6023 and the first vibration damping control torque calculation portion 603 (a vibration damping control torque calculation portion) configured to selectively output the vibration damping control torque calculated by the first estimation portion 6021 (a first calculation method) based on the signal of the wheel speed sensor 10, or the vibration damping control torque calculated by the second estimation portion 6022 (a second calculation method) based on the signal other than the signal of the wheel speed sensor 10, and the drive torque instruction value calculation portion 606 (a motor torque instruction calculation portion) configured to calculate the motor torque instruction for driving the electric motor 1 based on the requested drive torque and the vibration damping control torque.

Therefore, the first embodiment can prevent or reduce the shock when the vehicle starts running from the stopped state.

(2) In the control apparatus for the electric vehicle described in the above-described item (1), the first estimation portion 6021 calculates the VSP1, which is the estimated value of the vehicle body speed, based on the signal of the wheel speed sensor 10.

Therefore, the first embodiment can eliminate or reduce the vibration due to the torsion between the electric motor 1 and the wheel.

(3) In the control apparatus for the electric vehicle described in the above-described item (2), the second estimation portion 6022 calculates the VSP2, which is the estimated value of the vehicle body speed, based on the motor rotational speed Nm of the electric motor 1.

More specifically, the resolver indispensable for the electric vehicle has high resolution and can accurately detect the rotational speed information even when the vehicle starts running. Therefore, the first embodiment can prevent or reduce the shock when the vehicle starts running from the stopped state, by using the motor rotational speed Nm.

(4) In the control apparatus for the electric vehicle described in the above-described item (3), the vehicle body speed selection portion 6023 selects the VSP2 when the motor rotational speed Nm of the electric motor 1 is lower than the A1 (a first threshold value).

Therefore, the first embodiment allows the VSP2 to be estimated with use of the resolver 8 even in the region where the speed may be unable to be detected by the wheel speed sensor 10.

(5) In the control apparatus for the electric vehicle described in the above-described item (4), the vehicle body speed selection portion 6023 selects the VSP1 when the motor rotational speed Nm of the electric motor matches or exceeds the A2 (a second threshold value) higher than the A1 while the VSP2 is selected.

Therefore, the first embodiment can use the signal of the wheel speed sensor 10 in a state that the speed can be estimated by the wheel speed sensor 10 while avoiding the control hunting due to the switching between the VSP1 and the VSP2.

(6) In the control apparatus for the electric vehicle described in the above-described item (5), the signal of the wheel speed sensor 10 is based on the rotational speed of the trailer wheel side.

Therefore, the first embodiment allows the vibration damping control torque to be calculated appropriately with respect to the torsional vibration regardless of μ on the road surface, thereby succeeding in improving the effect of eliminating or reducing the torsional vibration.

(7) The control system for the electric vehicle configured to drive the wheel by the electric motor 1 includes the wheel speed sensor 10 configured to detect the wheel speed, the vehicle body speed selection portion 6023 and the first vibration damping control torque calculation portion 603 (a vibration damping control torque calculation portion) configured to selectively output the vibration damping control torque calculated by the first estimation portion 6021 (a first calculation method) based on the signal of the wheel speed sensor 10, or the vibration damping control torque calculated by the second estimation portion 6022 (a second calculation method) based on the signal other than the signal of the wheel speed sensor 10, and the drive torque instruction value calculation portion 606 (a motor torque instruction calculation portion) configured to calculate the motor torque instruction for driving the electric motor 1, based on the requested drive torque and the vibration damping control torque.

Therefore, the first embodiment can prevent or reduce the shock when the vehicle starts running from the stopped state.

(8) In the control system for the electric vehicle described in the above-described item (7), the first estimation portion 6021 calculates the VSP1, which is the estimated value of the vehicle body speed, based on the signal of the wheel speed sensor 10, and the second estimation portion 6022 calculates the VSP2, which is the estimated value of the vehicle body speed, based on the motor rotational speed Nm of the electric motor 1.

Therefore, the first embodiment can prevent or reduce the shock when the vehicle starts running from the stopped state and eliminate or reduce the vibration due to the torsion between the electric motor 1 and the wheel by using the motor rotational speed Nm.

(9) In the control system for the electric vehicle described in the above-described item (8), the vehicle body speed selection portion 6023 selects the VSP2 when the motor rotational speed Nm of the electric motor 1 is lower than the A1 (a first threshold value).

Therefore, the first embodiment allows the VSP2 to be estimated with use of the resolver 8 even in the region where the speed may be unable to be detected by the wheel speed sensor 10.

(10) In the control system for the electric vehicle described in the above-described item (9), the vehicle body speed selection portion 6023 selects the VSP1 when the motor rotational speed Nm of the electric motor matches or exceeds the A2 (a second threshold value) higher than the A1 while the VSP2 is selected.

Therefore, the first embodiment can use the signal of the wheel speed sensor 10 in a state that the speed can be estimated by the wheel speed sensor 10 while avoiding the control hunting due to the switching between the VSP1 and the VSP2.

(11) The method for controlling the electric vehicle configured to drive the wheel by the electric motor 1 includes the wheel speed sensor 10 configured to detect the signal of the wheel speed, carrying out the vibration damping control torque calculation of selectively outputting the vibration damping control torque calculated by the first estimation portion 6021 (a first calculation method) based on the signal of the wheel speed sensor 10, or the vibration damping control torque calculated by the second estimation portion 6022 (a second calculation method) based on the signal other than the signal of the wheel speed sensor 10, and carrying out the motor torque instruction calculation of calculating the motor torque instruction for driving the electric motor 1, based on the requested drive torque and the vibration damping control torque.

Therefore, the first embodiment can prevent or reduce the shock when the vehicle starts running from the stopped state.

(12) In the method for controlling the electric vehicle described in the above-described item (11), the first estimation portion 6021 calculates the VSP1, which is the estimated value of the vehicle body speed, based on the signal of the wheel speed sensor 10, and the second estimation portion 6022 calculates the VSP2, which is the estimated value of the vehicle body speed, based on the motor rotational speed Nm of the electric motor 1.

Therefore, the first embodiment can prevent or reduce the shock when the vehicle starts running from the stopped state and eliminate or reduce the vibration due to the torsion between the electric motor 1 and the wheel by using the motor rotational speed Nm.

(13) In the method for controlling the electric vehicle described in the above-described item (12), the vibration damping control torque calculation includes selecting the VSP2 when the motor rotational speed Nm of the electric motor 1 is lower than the A1 (a first threshold value).

Therefore, the first embodiment allows the VSP2 to be estimated with use of the resolver 8 even in the region where the speed may be unable to be detected by the wheel speed sensor 10.

(14) In the method for controlling the electric vehicle described in the above-described item (13), the vibration damping control torque calculation includes selecting the VSP1 when the motor rotational speed Nm of the electric motor matches or exceeds the A2 (a second threshold value) higher than the A1 while the VSP2 is selected.

Therefore, the first embodiment can use the signal of the wheel speed sensor 10 in a state that the speed can be estimated by the wheel speed sensor 10 while avoiding the control hunting due to the switching between the VSP1 and the VSP2.

(15) In the control apparatus for the electric vehicle described in the above-described item (1), the operation of switching the vibration damping control torque between the VSP1 and the VSP2 is performed so as to gradually approach the signal after the switching.

Therefore, the first embodiment can prevent or reduce a sudden change due to the switching of the vibration damping control torque calculated based on the VSP.

(16) In the control apparatus for the electric vehicle described in the above-described item (1), the first calculation method and the second calculation method are used to calculate the vibration damping control torque for preventing or reducing the change in the motor rotational speed Nm.

Therefore, the first embodiment can effectively generate the vibration damping control torque when the vehicle starts running from the stopped state.

Second Embodiment

Figure 8:
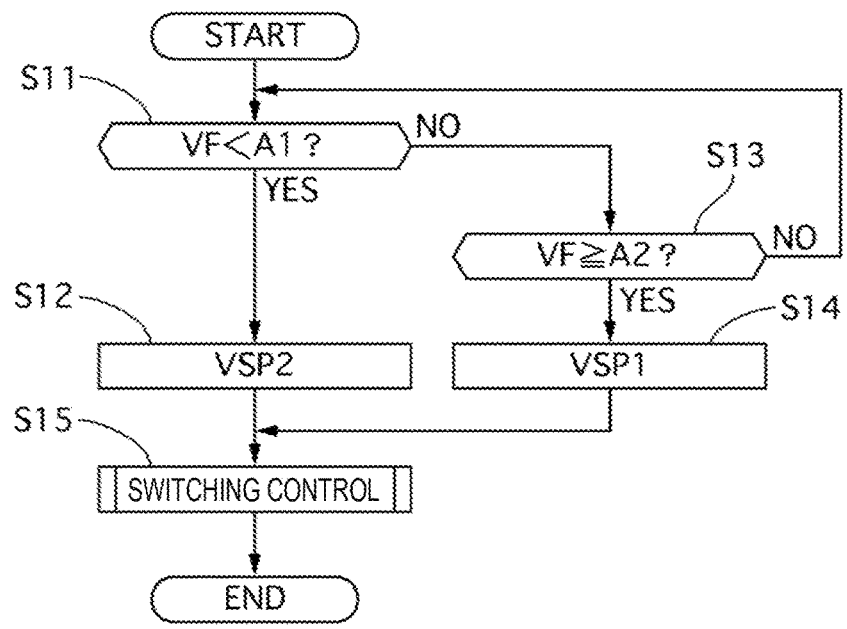
FIG. 8 is a flowchart illustrating control processing performed by a vehicle body speed selection portion according to a second embodiment.

Next, a second embodiment will be described. The second embodiment has a basic configuration similar to the first embodiment, and therefore will be described focusing on only differences therefrom. In the first embodiment, the vehicle body speed selection portion 6023 switches the estimated vehicle body speed based on the motor rotational speed Nm. On the other hand, the second embodiment is configured to switch the estimated vehicle body speed based on a drive wheel speed VF that is an average value of signals detected by the front left wheel speed sensor 10FL and the front right wheel speed sensor 10FR, which are the drive wheels. FIG. 8 is a flowchart illustrating control processing performed by a vehicle body speed selection portion according to the second embodiment. Steps S11 to S15 are substantially similar to steps S1 to S5 illustrated in FIG. 5 according to the first embodiment, except that a VF is used in steps S11 and S13 instead of the Nm in steps S1 and S3 in FIG. 5. By this operation, the second embodiment achieves similar effects to the first embodiment.

(17) In the control apparatus for the electric vehicle described in the above-described item (5), the signal of the wheel speed sensor is based on the rotational speed of the drive wheel side.

Therefore, the second embodiment can prevent or reduce the shock when the vehicle starts running from the stopped state.

(18) In the control apparatus for the electric vehicle described in the above-described item (3), the vehicle body speed selection portion 6023 selects the VSP2 when the signal VF of the wheel speed sensor 10 regarding the drive wheel side is lower than the A1 (a third threshold value).

Therefore, the second embodiment allows the VSP2 to be estimated with use of the resolver 8 even in the region where the speed may be unable to be detected by the wheel speed sensor 10.

(19) In the control apparatus for the electric vehicle described in the above-described item (18), the vehicle body speed selection portion 6023 selects the VSP1 when the VF matches or exceeds the A2 (a second threshold value) higher than the A1 while the VSP2 is selected.

Therefore, the second embodiment can use the signal of the wheel speed sensor 10 in a state that the speed can be estimated by the wheel speed sensor 10 while avoiding the control hunting due to the switching between the VSP1 and the VSP2.

Third Embodiment

Figure 9:
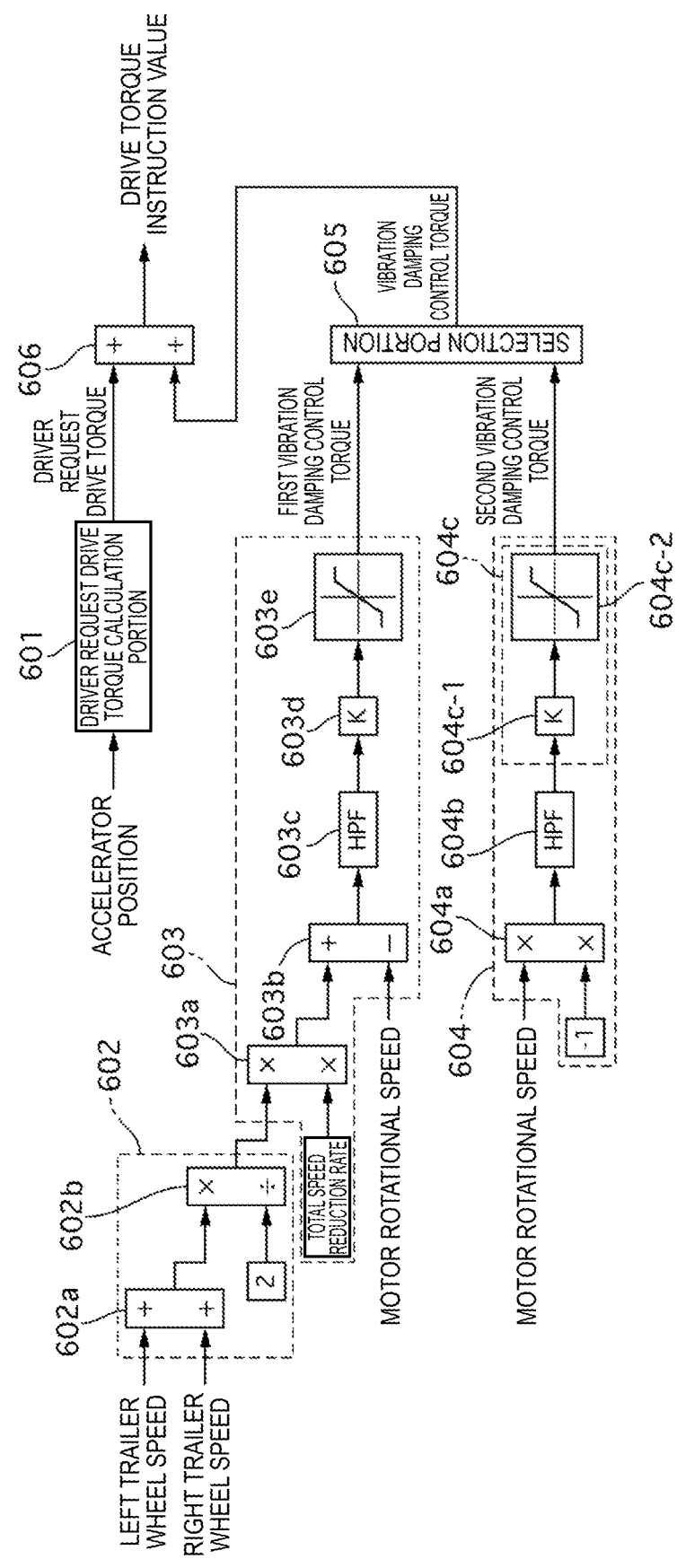
FIG. 9 is a control block diagram of the vehicle controller 6 according to a third embodiment.

Next, a third embodiment will be described. The third embodiment has a basic configuration similar to the first embodiment, and therefore will be described focusing on only differences therefrom. FIG. 9 is a control block diagram of the vehicle controller 6 according to the third embodiment. The first embodiment is configured to include only the first vibration damping control torque calculation portion 603. On the other hand, the third embodiment is different therefrom in terms of including a second vibration damping control torque calculation portion 603 in addition to the first vibration damping control torque calculation portion 603, and including a selection portion 605 that selects any one of the first vibration damping control torque and a second vibration damping control torque. Further, in the first embodiment, the vehicle body speed estimation portion 602 includes the first estimation portion 6021, the second estimation portion 6022, and the vehicle body speed selection portion 6023. On the other hand, in the third embodiment, the vehicle body speed estimation portion 602 includes only a vehicle body speed estimation portion corresponding to the first estimation portion 6021 according to the first embodiment, and does not include the second estimation portion 6022 and the vehicle body speed selection portion 6023. The first vibration damping control torque calculation portion 603 corresponds to a first calculation method set forth in the claims, and the second vibration damping control torque calculation portion 604 corresponds to a second calculation method set forth in the claims.

The second vibration damping control torque calculation portion 604 calculates the second vibration damping control torque based on the motor rotational speed. A multiplication portion 604a inverts a sign of the motor rotational speed by multiplying the motor rotational speed by −1. A high-pass filter 604b gradually reduces a vibration component having a predetermined frequency or lower from an output of the multiplication portion 604a. A cutoff frequency of the high-pass filter 604b is set to a value corresponding to the vehicle body speed in consideration of the inertia of the vehicle body (for example, approximately 1 Hz). A high-pass filter method-based vibration damping control torque calculation portion 604c calculates the second vibration damping control torque based on a vibration component that has passed through the high-pass filter 604b. A gain multiplication portion 604c-1 outputs, as the second vibration damping control torque, a value acquired by multiplying a vibration component that has passed through the high-pass filter 604b by a predetermined control gain K. A limiter processing portion 604c-2 limits upper and lower limit values of the second vibration damping control torque within a certain range.

The selection portion 605 selects one of the first vibration damping control torque calculated by the first vibration damping control torque calculation portion 603 and the second vibration damping control torque calculated by the second vibration damping control torque calculation portion 604, and outputs the selected vibration damping control torque as the vibration damping control torque. The selection portion 605 selects one of the first vibration damping control torque and the second vibration damping control torque according to the motor rotational speed. The selection portion 605 always selects the first vibration damping control torque when the vehicle is activated with the aim of simplification of the control.

A drive torque instruction value calculation portion 606 calculates the drive torque instruction value by adding the driver request drive torque calculated by the driver request drive torque calculation portion 601 and the vibration damping control torque output from the selection portion 605.

Figure 10:
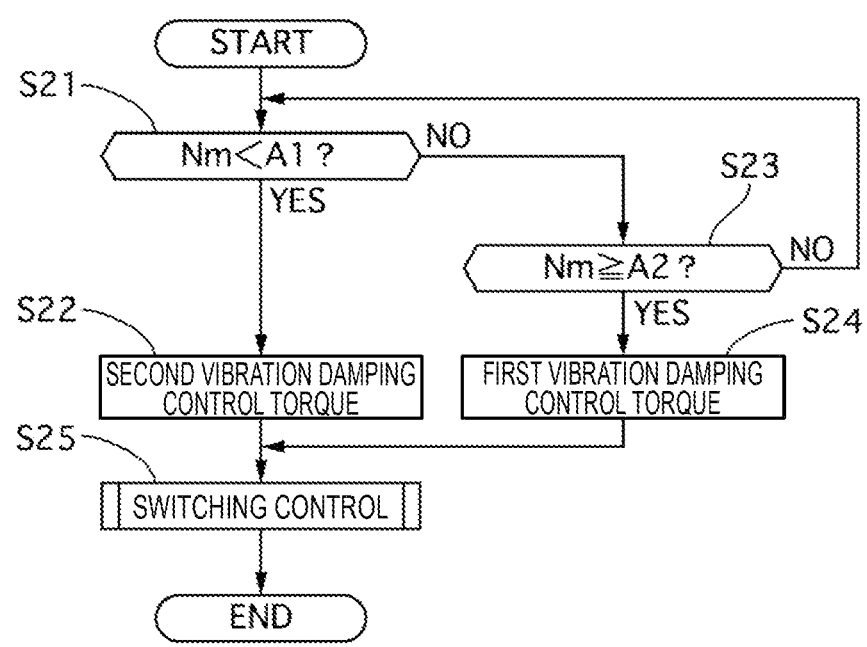
FIG. 10 is a flowchart illustrating control processing performed by a selection portion according to the third embodiment.

FIG. 10 is a flowchart illustrating control processing performed by the selection portion according to the third embodiment.

In step S21, the selection portion determines whether the motor rotational speed Nm is lower than the predetermined rotational speed A1. If the Nm is lower than the A1, the processing proceeds to step S22, in which the selection portion selects the second vibration damping control torque. If the Nm is the A1 or higher, the processing proceeds to step S23.

In step S23, the selection portion determines whether the motor rotational speed Nm is the predetermined rotational speed A2 or higher. If the Nm is the A2 or higher, the processing proceeds to step S24, in which the selection portion selects the first vibration damping control torque. If the Nm is lower than the A2, the processing returns to step S21. Now, the predetermined rotational speed A2 is the predetermined speed at which the control hunting can be avoided. As a result, the third embodiment can provide hysteresis to the switching between the first vibration damping control torque and the second vibration damping control torque, and secures a stable vibration damping performance by preventing or reducing the control hunting.

In step S25, the selection portion performs the switching control of smoothly switching the vibration damping control torque when switching the vibration damping control torque. In the following description, the switching control will be described in detail.

(Regarding Switching Control Processing)

Figure 11:
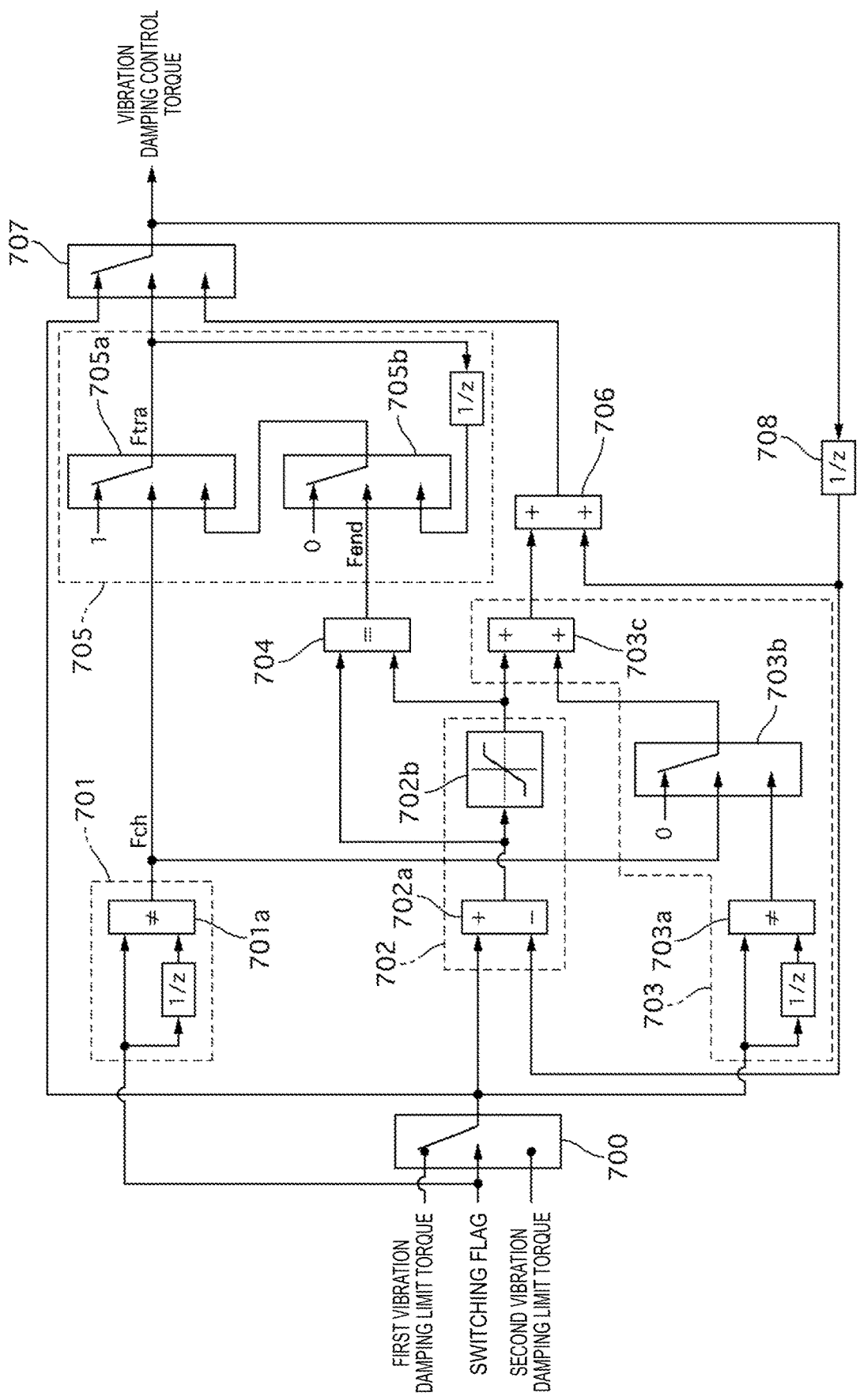
FIG. 11 is a control block diagram illustrating switching control processing according to the third embodiment.

FIG. 11 is a control block diagram illustrating the switching control processing according to the third embodiment. In FIG. 11, (1/Z) indicates the previous value. As the switching flag Fmm, Fmm=F12 is output when the vibration damping control torque is switched from the first vibration damping control torque to the second vibration damping control torque, and Fmm=F21 is output when the vibration damping control torque is switched from the second vibration damping control torque to the first vibration damping control torque.

The torque switching portion 700 outputs the post-switching vibration damping control torque according to the value of the switching flag Fmm. In other words, the second vibration damping control torque is the post-switching vibration damping control torque when the switching flag Fmm is Fmm=F12, and the first vibration damping control torque is the post-switching vibration damping control torque when the switching flag Fmm is Fmm=F21.

The transition processing start determination portion 701 determines whether the value of the switching flag Fmm does not match the previous value by the determination portion 701a, and outputs Fch=ON when the value of the switching flag Fmm does not match the previous value (when the switching flag Fmm is switched from F12 to F21 or F21 to F12), and otherwise outputs Fch=OFF.

The transition speed determination portion 702 calculates the first difference, which is the difference between the post-switching vibration damping control torque and the previous value of the vibration damping control torque (hereinafter referred to as the previous vibration damping control torque) currently output by the previous value output portion 708, by the first difference calculation portion 702a. Next, the limitation portion 702b outputs the first difference without limiting it if the first difference does not exceed the maximum limit value or the minimum limit value of the preset change amount, and outputs the limit value if the first difference exceeds the limit value. By this operation, the transition speed determination portion 702 sets the transition speed (the allowable change amount per unit time during the transition) when the vibration damping control torque transitions from one vibration damping control torque to the other vibration damping control torque, at the time of the switching of the vibration damping control torque.

The ongoing transition vibration damping performance compensation portion 703 calculates the second difference, which is the difference between the post-switching vibration damping control torque and the previous value of the post-switching vibration damping control torque, by the second difference calculation portion 703a. Next, the ongoing transition vibration damping performance compensation portion 703 outputs the second difference if Fch is ON and outputs 0 if Fch is OFF by the compensation determination portion 703b. Then, the ongoing transition vibration damping performance compensation portion 703 outputs the third difference, which is the sum of the value output from the transition speed determination portion 702 and the second difference, by the addition portion 703C. By this operation, the ongoing transition vibration damping performance compensation portion 703 compensates for the torque corresponding to the change in the post-switching vibration damping control torque, thereby securing the vibration damping performance, even before the vibration damping control torque is completely switched to the post-switching vibration damping control torque.

The transition processing end determination portion 704 determines whether the first difference and the first difference after the limitation (any of the limit value and the first difference) match each other. Then, if they match each other, the transition processing end determination portion 704 determines that the vibration damping control torque catches up with the post-switching vibration damping control torque and then outputs Fend=ON since the first difference is smaller than the limit value. If they do not match each other, the transition processing end determination portion 704 determines that the vibration damping control torque is in a limited state and does not yet catch up with the post-switching vibration damping control torque and then outputs Fend=OFF.

The transition processing ongoing determination portion 705 outputs the transition processing ongoing flag Ftra=1 when Fch is OFF and outputs the result of the determination made by the second determination portion 705b, which will be described below, when Fch is ON, by the first determination portion 705a. The second determination portion 705b outputs 0 when Fend is ON and outputs the previous value of the value output from the first determination portion 705a when Fend is OFF. In other words, the first determination portion 705a first outputs Ftra=1 when the request to switch the vibration damping control torque is output, and then switches the output to the result of the determination made by the second determination portion 705b upon the end of the switching request. At this time, while Fend is OFF, the result of the determination made by the second determination portion 705b is kept at 1, and therefore Ftra=1 is continuously output from the first determination portion 705a. After that, when the result of the determination made by the second determination portion 705b is changed to 0, 0 is also output to the first determination portion 705a, and therefore Ftr=0 is output from the first determination portion 705a.

The ongoing transition vibration damping control torque calculation portion 706 adds the previous value of the vibration damping control torque to the third difference. By this operation, the ongoing transition vibration damping control torque calculation portion 706 can output the vibration damping control torque during the transition according to the managed transition speed while compensating for the torque corresponding to the change in the post-switching vibration damping control torque, even during the transition according to the switching of the vibration damping control torque.

The final output determination portion 707 outputs any of the post-switching vibration damping control torque and the vibration damping control torque during the transition, based on the result of the determination made by the transition processing ongoing determination portion 705.

Figure 12:
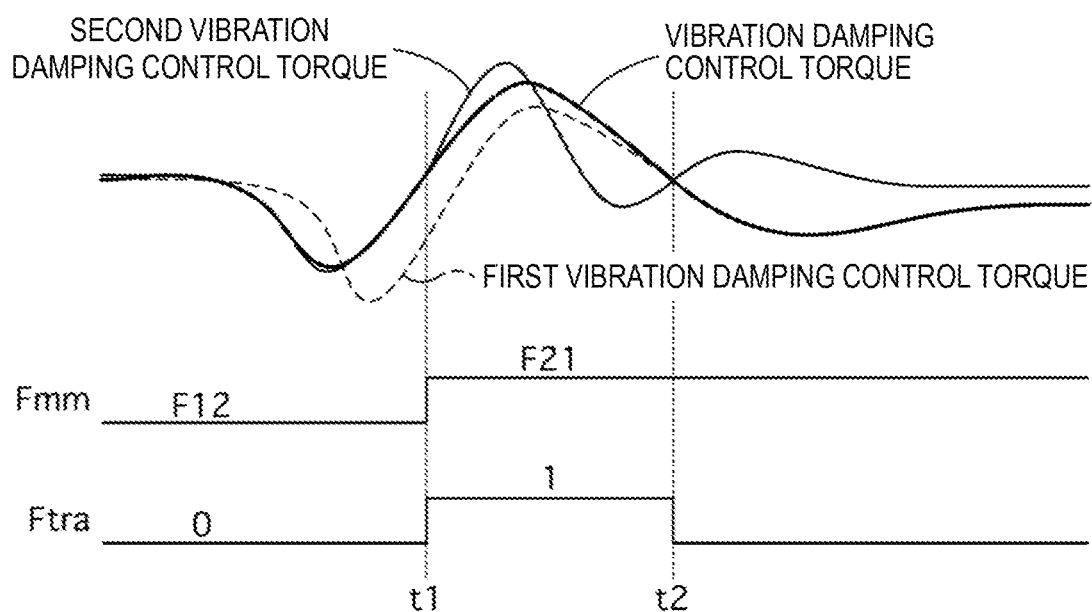
FIG. 12 is a timing chart illustrating the switching control processing according to the third embodiment.

FIG. 12 is a timing chart of switching control processing according to the third embodiment. This is a state in which the vehicle is first running in the R range and the second vibration damping control torque is selected.

At time t1, when the switching flag Fmm is switched from F12 to F21, the transition processing ongoing flag Ftra changes from 0 to 1. Then, a value gradually approaching from the second vibration damping control torque to the first vibration damping control torque is output as the vibration damping control torque.

At time t2, when the vibration damping control torque and the first vibration damping control torque match each other, the transition processing ongoing flag Ftra changes from 1 to 0, and the first vibration damping control torque is output as the vibration damping control torque. As a result, the switching is fully completed.

In this manner, the third embodiment can realize the switching that does not cause the driver to feel uncomfortable while securing the vibration damping performance by gradually approaching the vibration damping control torque after the switching while taking into consideration the torque corresponding to the change in the vibration damping control torque after the switching, even if there is a deviation between the first vibration damping control torque and the second vibration damping control torque when the vibration damping control torque is switched.

Fourth Embodiment

Figure 13:
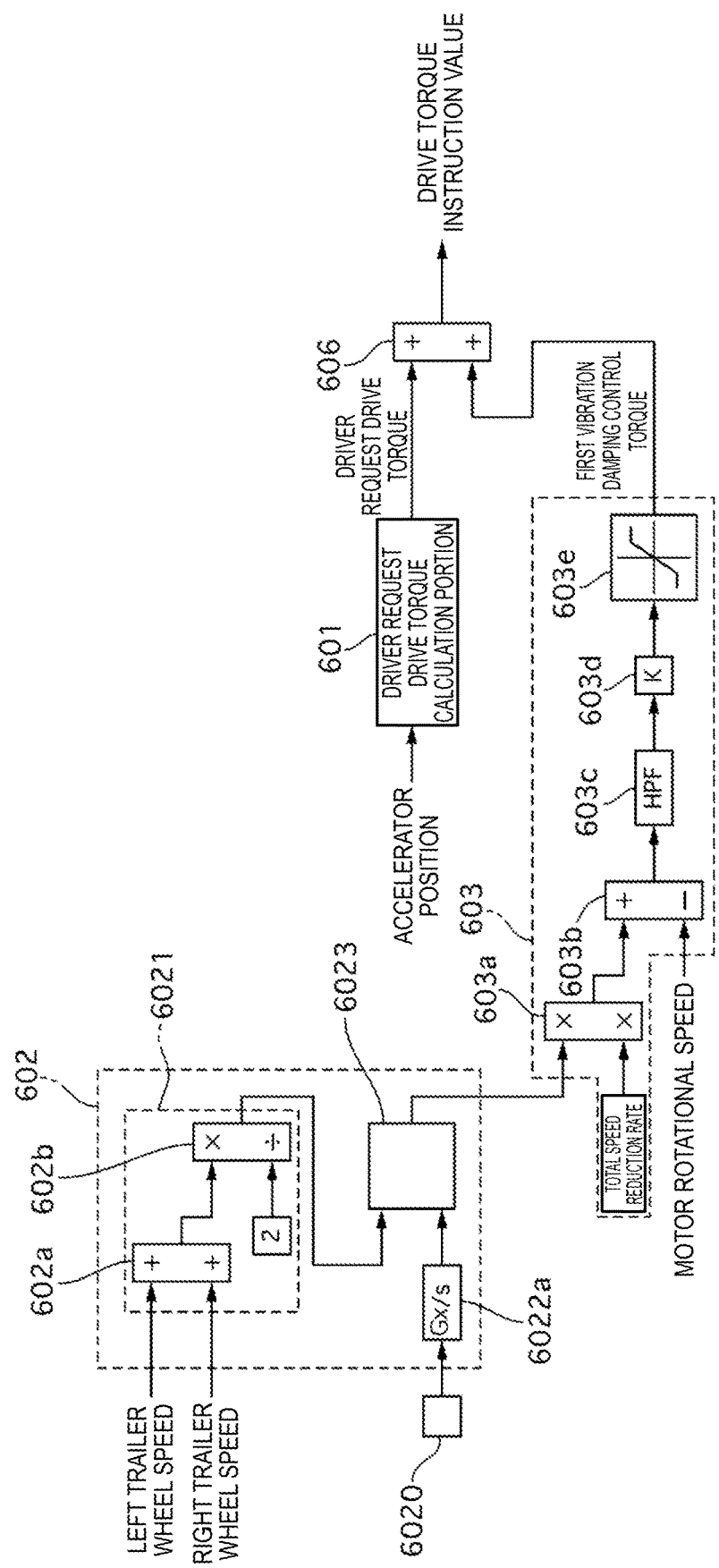
FIG. 13 is a control block diagram of the vehicle controller 6 according to a fourth embodiment.

Next, a fourth embodiment will be described. The fourth embodiment has a basic configuration similar to the first embodiment, and therefore will be described focusing on only differences therefrom. FIG. 13 is a control block diagram of the vehicle controller 6 according to the fourth embodiment. In the first embodiment, the second estimation portion 6022 outputs the value acquired by causing the motor rotational speed Nm to pass through the low-pass filter. On the other hand, the fourth embodiment is different therefrom in terms of including a longitudinal acceleration sensor 6020, which detects a longitudinal acceleration of the electric vehicle instead of the motor rotational speed Nm. Further, a second estimation portion 6022a calculates the VSP2 by integrating (corresponding to 1/s in FIG. 13) a detected longitudinal acceleration signal (hereinafter also referred to as a Gx). By this operation, the fourth embodiment allows the VSP2 to be accurately detected with use of the longitudinal acceleration sensor 6020 even when the vehicle starts running from the stopped state in which it is difficult to acquire the resolution of the wheel speed sensor 10, thereby succeeding in achieving similar effects to the first embodiment.

(20) In the control apparatus for the electric vehicle described in the above-described item (2), the second estimation portion 6022 calculates the estimated value VSP2 of the vehicle body speed, based on the signal of the longitudinal acceleration sensor 6020 of the vehicle.

Therefore, the fourth embodiment allows the vehicle body speed to be estimated based on the sensor value having an early phase, thereby succeeding in highly accurately performing the vibration damping control when the vehicle starts running.

Fifth Embodiment

Figure 14:
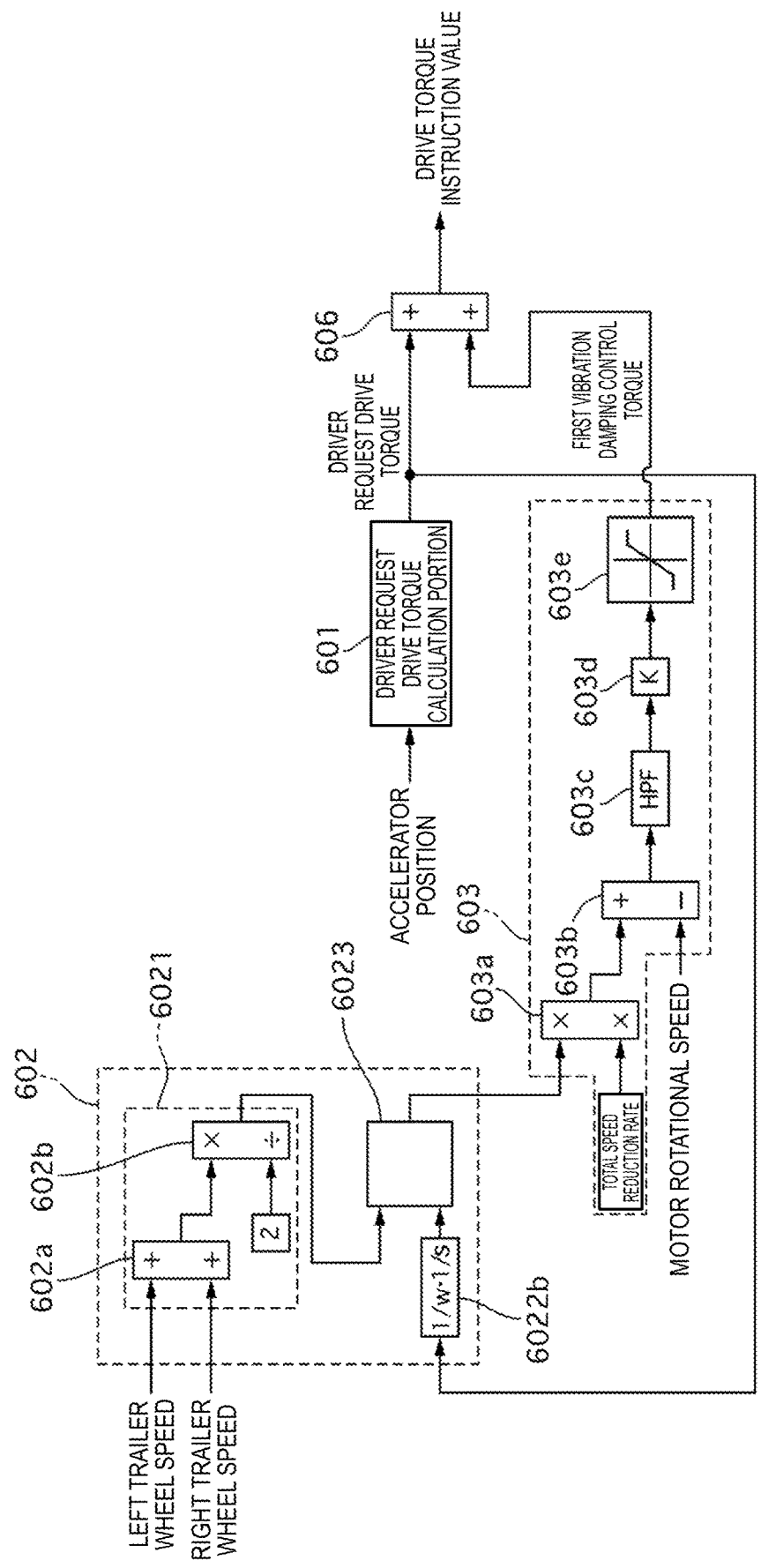
FIG. 14 is a control block diagram of the vehicle controller 6 according to a fifth embodiment.

Next, a fifth embodiment will be described. The fifth embodiment has a basic configuration similar to the first embodiment, and therefore will be described focusing on only differences therefrom. FIG. 14 is a control block diagram of the vehicle controller 6 according to the fifth embodiment. In the first embodiment, the second estimation portion 6022 outputs the value acquired by causing the motor rotational speed Nm to pass through the low-pass filter. On the other hand, the fifth embodiment is different therefrom in terms of calculating the VSP2 with use of a vehicle acceleration model based on the driver request drive torque instead of the motor rotational speed Nm. A second estimation portion 6022b converts the driver request drive torque into a vehicle longitudinal force Fd, and calculates the VSP2 from an equation of motion based on the Fd. Assuming that W represents a weight of the electric vehicle, the acceleration generated by the electric motor is Fd/W. The second estimation portion 6022b calculates the VSP2 by integrating (corresponding to 1/s in FIG. 14) that. By this operation, the fifth embodiment allows the VSP2 to be accurately detected with use of the driver request drive torque even when the vehicle starts running from the stopped state in which it is difficult to acquire the resolution of the wheel speed sensor 10, thereby succeeding in achieving similar effects to the first embodiment.

(21) In the control apparatus for the electric vehicle described in the above-described item (2), the second estimation portion 6022 calculates the estimated value VSP2 of the vehicle body speed, based on the vehicle acceleration model estimated according to the equation of motion.

Therefore, the fifth embodiment allows the vehicle body speed to be estimated based on the driver request drive torque having an early phase, thereby succeeding in highly accurately performing the vibration damping control when the vehicle starts running.

Having described embodiments for implementing the present invention based on the exemplary embodiments thereof, the specific configuration of the present invention is not limited to the configurations indicated in the exemplary embodiments, and the present invention also includes a design modification and the like thereof made within a range that does not depart from the spirit of the present invention. Further, the individual components described in the claims and the specification can be arbitrarily combined or omitted within a range that allows them to remain capable of achieving at least a part of the above-described objects or producing at least a part of the above-described advantageous effects.

For example, in the exemplary embodiments, the vehicle has been described citing the electric vehicle as an example, but the present invention can also be applied even to a hybrid vehicle including both the engine and the electric motor. Further, in the exemplary embodiments, the first vibration damping control torque is calculated based on the rotational speed of the trailer wheel side when being calculated, but may be calculated based on the rotational speed of the drive wheel side.

The present application claims priority to Japanese Patent Application No. 2015-200697 filed on Oct. 9, 2015. The entire disclosure of Japanese Patent Application No. 2015-200697 filed on Oct. 9, 2015 including the specification, the claims, the drawings, and the abstract is incorporated herein by reference in its entirety.

REFERENCE SIGN LIST

FL, FR front wheel (drive wheel)
RL, RR rear wheel (trailer wheel)
1 electric motor
2 speed reduction mechanism
3 differential gear
4 drive shaft
5 inverter
6 vehicle controller
7 accelerator position sensor
8 resolver
9 brake controller
10 wheel speed sensor
11 CAN communication line (communication apparatus)
601 driver request drive torque calculation portion
602 vehicle body speed estimation portion
603 first vibration damping control torque calculation portion
604 second vibration damping control torque calculation portion
605 selection portion
606 drive torque instruction value calculation portion
6023 vehicle body speed selection portion
6020 longitudinal acceleration sensor
6021 first estimation portion
6022 second estimation portion
6022a second estimation portion
6022b second estimation portion
6023 vehicle body speed selection portion

The invention claimed is:

1. A control apparatus for an electric vehicle configured to drive a wheel by an electric motor, the control apparatus comprising:
a vibration damping control torque calculation portion configured to selectively output a first vibration damping control torque calculated by a first calculation method, or a second vibration damping control torque calculated by a second calculation method; and
a motor torque instruction calculation portion configured to calculate a motor torque instruction for driving the electric motor, based on a requested drive torque and the selectively output first vibration damping control torque or second vibration damping control torque, wherein
the first calculation method is based on a difference between an estimated value of a vehicle body speed calculated based on a pulsed signal of a wheel speed sensor on a trailer wheel side, and a signal of a motor rotational speed sensor configured to detect a rotational speed of the electric motor,
the second calculation method is based on a difference between an estimated value of the vehicle body speed calculated based on one of the signal of the motor rotational speed sensor, a signal of a longitudinal acceleration sensor of the electric vehicle, and a vehicle acceleration model estimated according to an equation of motion, and the signal of the motor rotational speed sensor, and
the vibration damping control torque calculation portion outputs the second vibration damping control torque when the rotational speed of the electric motor is lower than a first threshold value.

2. The control apparatus for the electric vehicle according to claim 1, wherein the vibration damping control torque calculation portion outputs the first vibration damping control torque instead of the second vibration damping control torque when the rotational speed of the electric motor matches or exceeds a second threshold value higher than the first threshold value while the second vibration damping control torque is output.

3. The control apparatus for the electric vehicle according to claim 1, wherein an operation of switching the vibration damping control torque between the first vibration damping control torque and the second vibration damping control torque is performed in such a manner that the vibration damping control torque before the switching gradually approaches the vibration damping control torque after the switching.

4. The control apparatus for the electric vehicle according to claim 1, wherein the first calculation method and the second calculation method are used to calculate the vibration damping control torque for preventing or reducing a change in a rotational speed of the electric motor.

5. A control system for an electric vehicle configured to drive a wheel by an electric motor, the control system comprising:
a wheel speed sensor configured to detect a wheel speed;
a vibration damping control torque calculation portion configured to selectively output a first vibration damping control torque calculated by a first calculation method, or a second vibration damping control torque calculated by a second calculation method;
a requested drive torque calculation portion configured to calculate a drive torque requested to the electric vehicle; and
a motor torque instruction calculation portion configured to calculate a motor torque instruction for driving the electric motor, based on the drive torque and the selectively output first vibration damping control torque or second vibration damping control torque, wherein
the first calculation method is based on a difference between an estimated value of a vehicle body speed calculated based on a pulsed signal of a wheel speed sensor on a trailer wheel side, and a signal of a motor rotational speed sensor configured to detect a rotational speed of the electric motor,
the second calculation method is based on a difference between an estimated value of the vehicle body speed calculated based on one of the signal of the motor rotational speed sensor, a signal of a longitudinal acceleration sensor of the electric vehicle, and a vehicle acceleration model estimated according to an equation of motion, and the signal of the motor rotational speed sensor, and
the vibration damping control torque calculation portion outputs the second vibration damping control torque when the rotational speed of the electric motor is lower than a first threshold value.

6. The control system for the electric vehicle according to claim 5, wherein the vibration damping control torque calculation portion outputs the first vibration damping control torque instead of the second vibration damping control torque when the rotational speed of the electric motor matches or exceeds a second threshold value higher than the first threshold value while the second vibration damping control torque is output.

7. A method for controlling an electric vehicle configured to drive a wheel by an electric motor, the method comprising:
- carrying out a vibration damping control torque calculation of selectively outputting a first vibration damping control torque calculated by a first calculation method, or a second vibration damping control torque calculated by a second calculation method; and
- carrying out a motor torque instruction calculation of calculating a motor torque instruction for driving the electric motor, based on a drive torque requested to the electric vehicle and the selectively output first vibration damping control torque or second vibration damping control torque, wherein
- the first calculation method is based on a difference between an estimated value of a vehicle body speed calculated based on a pulsed signal of a wheel speed sensor on a trailer wheel side, and a signal of a motor rotational speed sensor configured to detect a rotational speed of the electric motor,
- the second calculation method is based on a difference between an estimated value of the vehicle body speed calculated based on one of the signal of the motor rotational speed sensor, a signal of a longitudinal acceleration sensor of the electric vehicle, and a vehicle acceleration model estimated according to an equation of motion, and the signal of the motor rotational speed sensor, and
- the vibration damping control torque calculation includes outputting the second vibration damping control torque when the rotational speed of the electric motor is lower than a first threshold value.

8. The method for controlling the electric vehicle according to claim 7, wherein the vibration damping control torque calculation includes outputting the first vibration damping control torque instead of the second vibration damping control torque when the rotational speed of the electric motor matches or exceeds a second threshold value higher than the first threshold value while the second vibration damping control torque is output.

* * * * *